United States Patent [19]

Corinthios

[11] E Patent Number: Re. 32,716

[45] Reissued Date of Patent: Jul. 19, 1988

[54] CHESS GAME APPARATUS

[76] Inventor: Michael J. Corinthios, 5768 Notre Dame de Grace Ave., Montreal, Quebec H4A 1M4, Canada

[21] Appl. No.: 945,484

[22] Filed: Dec. 23, 1986

Related U.S. Patent Documents

Reissue of:

[64] Patent No.: 4,033,586
Issued: Jul. 5, 1977
Appl. No.: 604,340
Filed: Aug. 13, 1975

[51] Int. Cl.[4] ..... A63F 3/02
[52] U.S. Cl. ..... 273/260
[58] Field of Search ..... 273/260, 262, 261

[56] References Cited

U.S. PATENT DOCUMENTS

| | | | |
|---|---|---|---|
| 630,647 | 8/1899 | Billingsley | 273/260 |
| 1,141,909 | 12/1914 | D'Autremont | 273/260 |
| 3,610,626 | 10/1971 | Nolte | 273/131 AB |

OTHER PUBLICATIONS

Gollon, Chess Variations Ancient, Regional, and Modern, Chapter 29 "Chancellor Chess", pp. 214–218, 1974.
"Chess and Playing Cards" by Stewart Culin; published 1898; pp. 867 and 868 cited.

*Primary Examiner*—Richard C. Pinkham
*Assistant Examiner*—Benjamin Layno
*Attorney, Agent, or Firm*—Fleit, Jacobson, Cohn & Price

[57] ABSTRACT

The invention relates to a chess-type game for two players, comprising a board and chessmen, the board being uniformly divided into playing positions and having n distinguished boundaries. The chessmen of each player comprise a king, a plurality of pawns and a plurality of major pieces. Each of the major pieces is included in even amounts, the major pieces comprising a prince, a bishop, a rook and a knight. The board is square and is uniformly divided into 81 squares with nine squares on each side. Each player is provided with two of each of the major pieces so that each player has the following chessmen: a king, nine pawns and eight major pieces, namely, two princes, two bishops, two knights and two rooks.

1 Claim, 2 Drawing Sheets

CHESS GAME APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a novel chess-like class of games for two players and comprising a game board divided into playing positions and playing pieces, the number and arrangement of the positions and pieces being such that perfect symmetry is obtained on the board with respect to a uniquely identifiable central file of positions of each player.

In one embodiment herein referred to as two-player Grandchess, the board is square and is divided into 81 squares and each player has 18 pieces.

2. Statement of the Prior Art

The games herein are developed from and have many similarities to and differences from the well known game of chess which will be referred to as "regular or conventional chess". A description of the present day chess can be found, for example, in the Encyclopedia Britanica (see for examples 1958 edition, vol. 5, pages 423–435).

SUMMARY OF THE INVENTION

In accordance with the invention, a chess-like game for two players comprises a board and chessmen, said board being uniformaly divided into playing positions and having distinguished boundaries, the chessmen of each player comprising a king, a plurality of pawns and a plurality of major pieces, said major pieces comprising an even number of princes, an even number of rooks, an even number of bishops and an even number of knights.

In one embodiment the board is square and the playing positions comprise squares. The board is divided into 81 squares. Each side of the board is nine squares long, and the pieces of each of the players include two of each of the major pieces, whereby the chessmen of each player comprise a king, nine pawns, and eight major pieces namely two princes, two bishops, two knights and two rooks.

BRIEF DESCRIPTION OF THE DRAWINGS

The invention will be better understood by an examination of the following description together with the accompanying drawings in which.

DETAILED DESCRIPTION OF THE DRAWINGS

The Board

Figure 1:
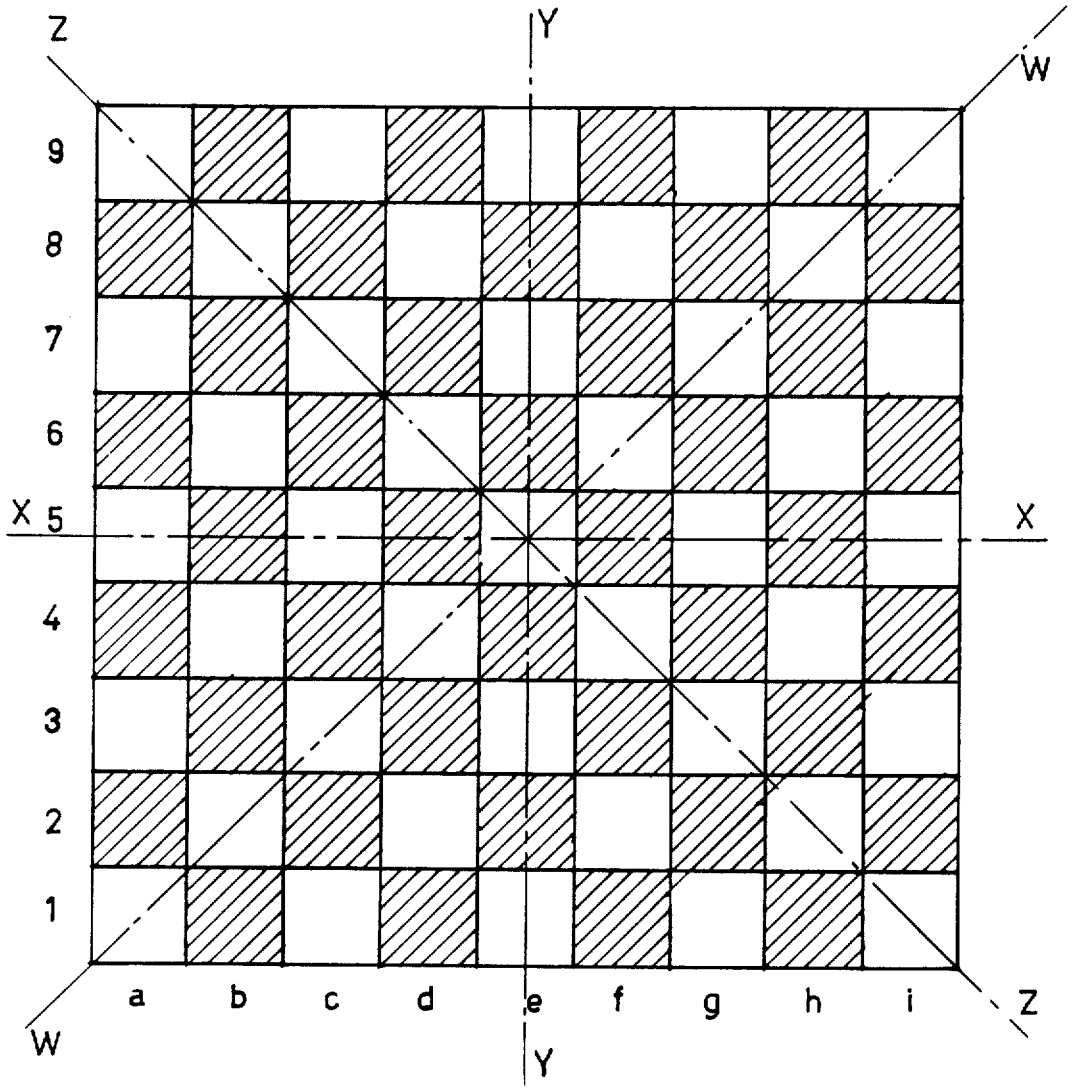
FIG. 1 illustrates a basic board in accordance with the invention for use by two players.

Referring to FIG. 1, the basic Grandchess board comprises 81 squares which may be coloured alternately light and dark for better visibility. The players, designated White and Black, sit on opposite sides of the board. A row parallel to one side of the square board is called a rank; a row at right angles to the ranks is a file. The board has nine ranks and nine files as shown in FIG. 1. We note that the four corners of the board have the same colour, in contrast to the conventional Chess board where two corners are dark and the other two are light. An algebraic notation may be used to designate the squares of the board, as shown in FIG. 1. Thus the central square of the board for example is designated square e 5. Alternatively, a geometric notation may be employed with the central square of the board, for example, as the origin of cartesian coordinates, i.e., the point (0,0). In this system the bottom left hand corner square in FIG. 1 is designated as the square (−4, −4).

Also shown in FIG. 1 are four axes of symmetry of the Grandchess board. These are the horizontal axis X—X, the vertical axis Y—Y and the inclined axes W—W and Z—Z. In contrast to Regular Chess we have a unique central file (the e file), a unique central rank (the fifth rank) and a unique central square (square e 5).

The Pieces

Each player in this game has 18 pieces; the king, nine pawns and eight "major pieces". These major pieces are in the form of four pairs; a pair of princes, a pair of rooks, a pair of bishops and a pair of knights. A "prince" in Grandchess is identical to a "queen" in Regular Chess. Thus in Grandchess a player has two princes each having the power of the queen of Regular Chess. All other pieces of Grandchess have substantially the same significance, rules of movement and of capture of other pieces as those associated with them in Regular Chess.

The Initial Set-up

Figure 2:
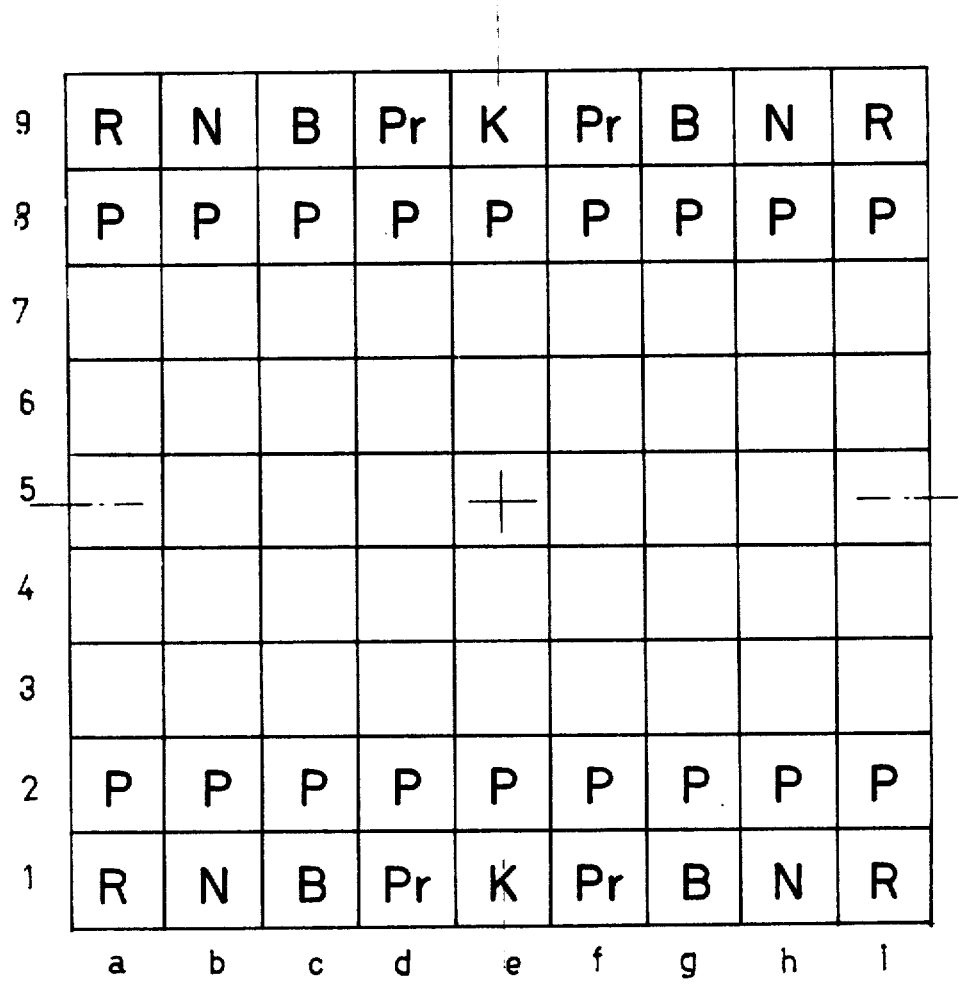
FIG. 2 shows the arrangement of chessmen for the board of FIG. 1.

In Grandchess the 18 pieces of each player are set up in such a way that symmetry about the line joining the two opposing kings (the central file) is obtained. This symmetry does not exist in Regular Chess, and is made possible here through the addition of an extra "queen" (prince) and the enlargement of the size of the board. As shown in FIG. 2 the king of each player in Grandchess stands at one end of the central file with the king pawn standing on the square adjacent to it on the central file. The major pieces (the pair of princes, the pair of rooks, the pair of bishops and the pair of knights) of White are situated on the first rank on the four squares to the right and the four squares to the left of the king such that each pair of a kind (a pair of knights for example) is symmetrically positioned with respect to the king; i.e., the right and left members of each pair are equidistant from the king. Thus, for example, if a prince is positioned on square f1 the second prince should be positioned on d1. The remaining eight pawns are situated on the right and left side of the king pawn on the second rank. In a similar way Black's pieces are positioned on the ninth and the eighth rank, as shown in FIG. 2.

The Course of the Game

As noted earlier the rules of movement and capturing are substantially the same as for Regular Chess. However, fine details such as the number of squares a pawn can move from its base line (second rank for White) and capturing en passant can be presently adopted for Grandchess but need not be rigidly kept in all set-up variations.

Adopting identically the rules of movement, capturing and pawn promotion of Regular Chess yields a very interesting game where controlling the central square and the diagonals of the board, the beauty of perfect symmetry and the large dimension of the "battle field" (the board) are factors that add to the pleasure of the player, stimulate his imagination and tax his skill and ingenuity. Castling on the left or the right side is equally useful, and may be performed in a way identical to queen-side castling of Regular Chess. This is not a necessary condition, however, and could be replaced by a castling similar to king-side castling of Regular Chess, where the king ends up at the second square from the edge of the board (squares b1 and h1 for White). Moreover, we note that the symmetry in Grandchess implies positioning the two bishops on squares of identical colour, and hence to their moving along diagonals of the same colour. They can thus reinforce each other's action considerably, particularly when they are both on the same diagonal. On the other hand, left alone with their king they would not be able to force a mate on the adversary king.

Advantages of Grandchess over Regular Chess

1. In contrast to Regular chess, in the initial set-up a player's major pieces are located symmetrically around the king. This is a more natural set-up and resembles more closely the optimum positioning that would be chosen by a warring army. The king is moreover guarded by a prince on either side.

2. There is one unique central file for which enemy forces will compete and one unique central rank defining the border between the two armies.

3. There is one unique central square in the middle of the battleground (the board) for which each player will compete and on which he will try to place one major piece, or, alternately, take advantage of the adversary's preoccupation with it to launch an attack from the side.

4. In Regular Chess castling on the queen side is considered weaker than castling on the king side. In Grandchess the perfect symmetry of the set-up makes castling on either side equally effective.

5. The Grandchess board has 17 squares more than the Regular Chess board, and has two "chessmen" more than those of Regular chess. Moreover, due to the symmetry, a larger number of variations becomes natural. Grandchess is thus a more complex game which includes many more permutations than Regular Chess. Adding such complexity to the game while at the same time perfecting its symmetry yields a game that adds to the intrigue, stimulates the imagination and tests the ingenuity of the player, for exploiting the symmetry (or lack of it) of a position during a game and using it to his own advantage.

6. Computer programs for playing or analysis of chess would benefit from the symmetry around the central file and central rank of the board to reduce considerably the programming complexity and the memory requirement for such programs.

7. The introduction of such a new game would incite new research and subsequently publications and literature on the analysis of the openings in the different variations, middle game and end game, and thus generate a new interest in the game in general.

8. The inclusion of two princes (queens) and two bishops in Grandchess that move on the same row of squares and thus reinforce each other considerably, as do the rooks in conventional chess, leads to more dynamic, critically balanced and possibly more violent battles and would require more caution from players than in Regular Chess.

I claim:

1. A chess type game for two players comprising *a plurality of chessmen,* a square board, said board being uniformly divided into eighty-one squares, each side of said board being nine squares long, and wherein the chessmen of each player consist of a king, nine pawns and eight major pieces, namely, two princes, two bishops, two knights and two rooks, each of said kings, pawns, bishops, knights and rooks having the same moves and strengths as the corresponding [pieces] *chessmen* in conventional chess, *chessmen having identical moves and strengths being of a form which indicate this identicality, and specifically, the pawns being of an undistinguishable form which indicates that every pawn has the same moves and strengths of every other pawn,* each of said princes having the same moves and strengths as the [queens] *queen* in conventional chess, the [pieces] *chessmen* of one player being disposed, at the beginning of each game, with the king of the player in the central square of the first row of one end of the board, the major [pieces] *chessmen* being disposed on said first row in symmetrical arrangement about said king, and the pawns being disposed in the second row at said end of said board, the [pieces] *chessmen* of the other player being disposed, in similar arrangement, at the end of the board opposing said end.

* * * * *